United States Patent
Jess et al.

(10) Patent No.: US 8,311,718 B2
(45) Date of Patent: Nov. 13, 2012

(54) NEGATIVE WHEEL SLIP CONTROL SYSTEMS AND METHODS

(75) Inventors: Richard B. Jess, Haslett, MI (US); Paul A. Bauerle, Fenton, MI (US); Christopher E. Whitney, Highland, MI (US); James L. Worthing, Munith, MI (US); Michael L. Kociba, Hartland, MI (US)

(73) Assignee: GM Global Technology Operations LLC

( * ) Notice: Subject to any disclaimer, the term of this patent is extended or adjusted under 35 U.S.C. 154(b) by 573 days.

(21) Appl. No.: 12/554,287

(22) Filed: Sep. 4, 2009

(65) Prior Publication Data

US 2011/0060487 A1 Mar. 10, 2011

(51) Int. Cl.
*B60B 39/00* (2006.01)

(52) U.S. Cl. ............... 701/71; 701/22; 701/70

(58) Field of Classification Search .............. 701/22, 701/70–71
See application file for complete search history.

(56) References Cited

U.S. PATENT DOCUMENTS

| | | | | |
|---|---|---|---|---|
| 6,086,166 | A * | 7/2000 | Fukasawa | 303/152 |
| 7,713,166 | B2 * | 5/2010 | Frank et al. | 477/45 |
| 7,974,761 | B2 * | 7/2011 | Maeda et al. | 701/70 |
| 2004/0122579 | A1 * | 6/2004 | Ashizawa et al. | 701/70 |
| 2007/0018499 | A1 * | 1/2007 | Kokubo et al. | 303/151 |
| 2007/0107958 | A1 * | 5/2007 | Oliver | 180/65.4 |
| 2008/0228368 | A1 * | 9/2008 | Fuhrer et al. | 701/81 |
| 2009/0118886 | A1 * | 5/2009 | Tamai et al. | 701/22 |
| 2009/0222156 | A1 * | 9/2009 | Krueger et al. | 701/22 |
| 2010/0250042 | A1 * | 9/2010 | Shamoto | 701/22 |

* cited by examiner

*Primary Examiner* — Hussein A. Elchanti

(57) ABSTRACT

An engine control system comprises a derivative module and a slip remediation module. The derivative module determines a mathematical derivative of a driven wheel speed of a vehicle. The slip remediation module, when the mathematical derivative is more negative than a predetermined deceleration, at least one of disables regenerative braking being performed by one or more electric motors, increases an axle torque request, and unlocks a torque converter.

20 Claims, 5 Drawing Sheets

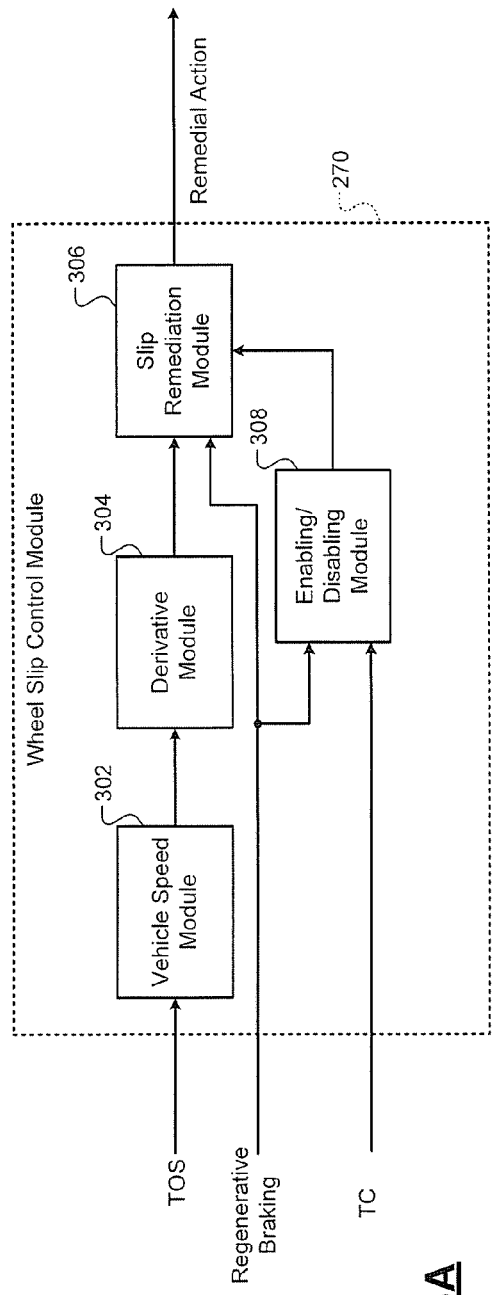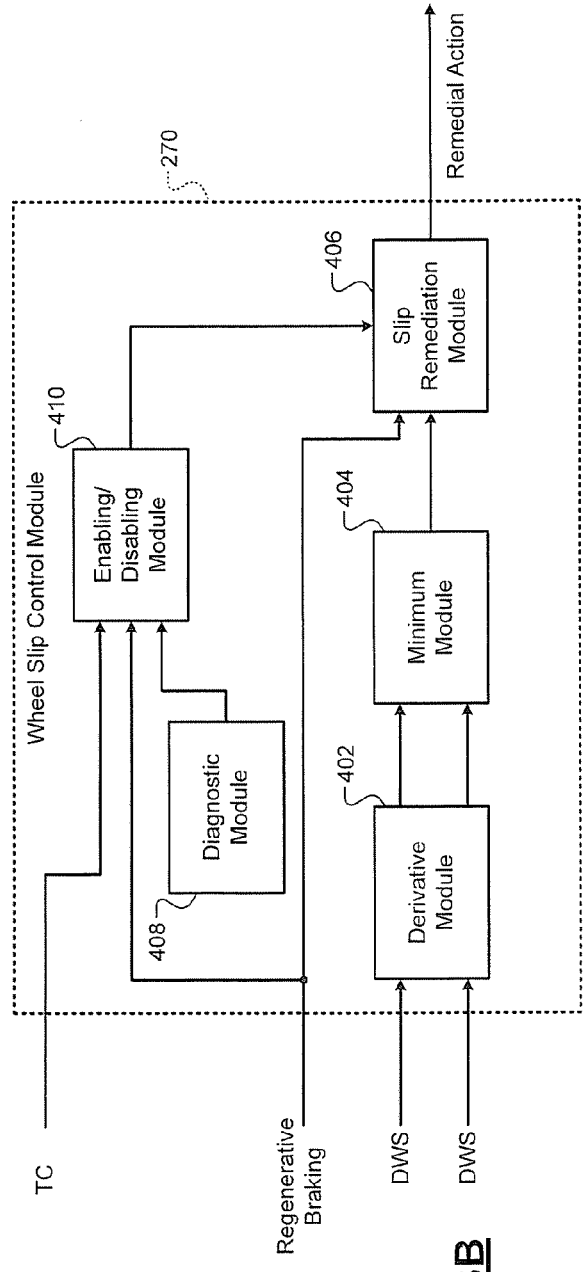
FIG. 3A
FIG. 3B

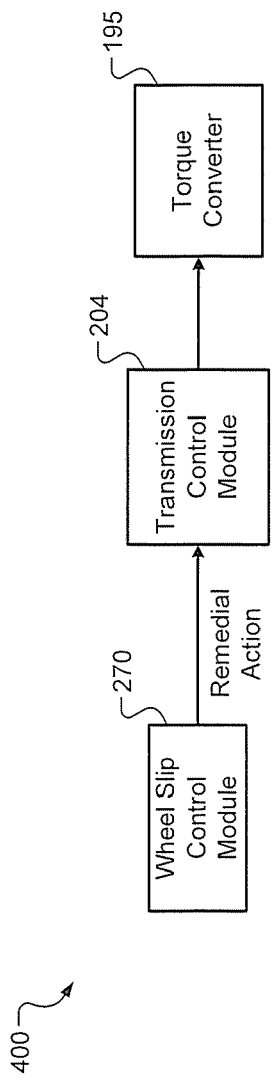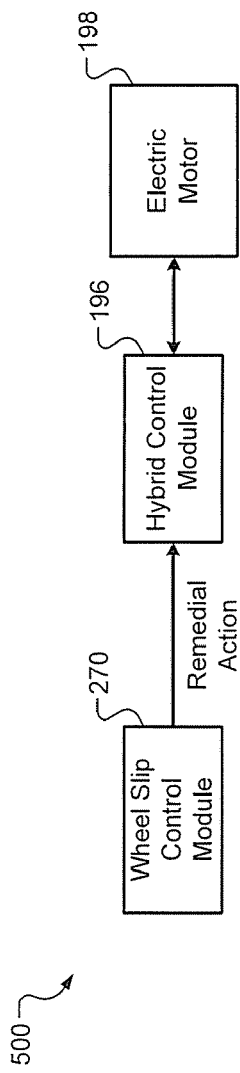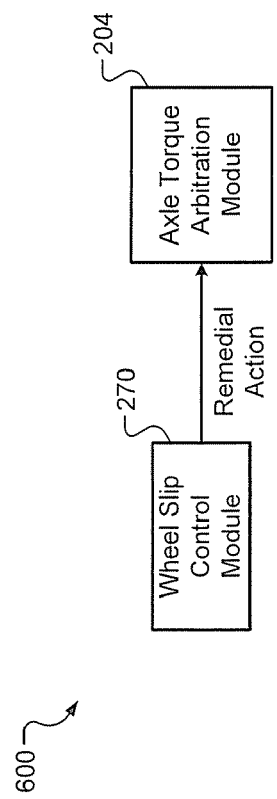
FIG. 4
FIG. 5
FIG. 6

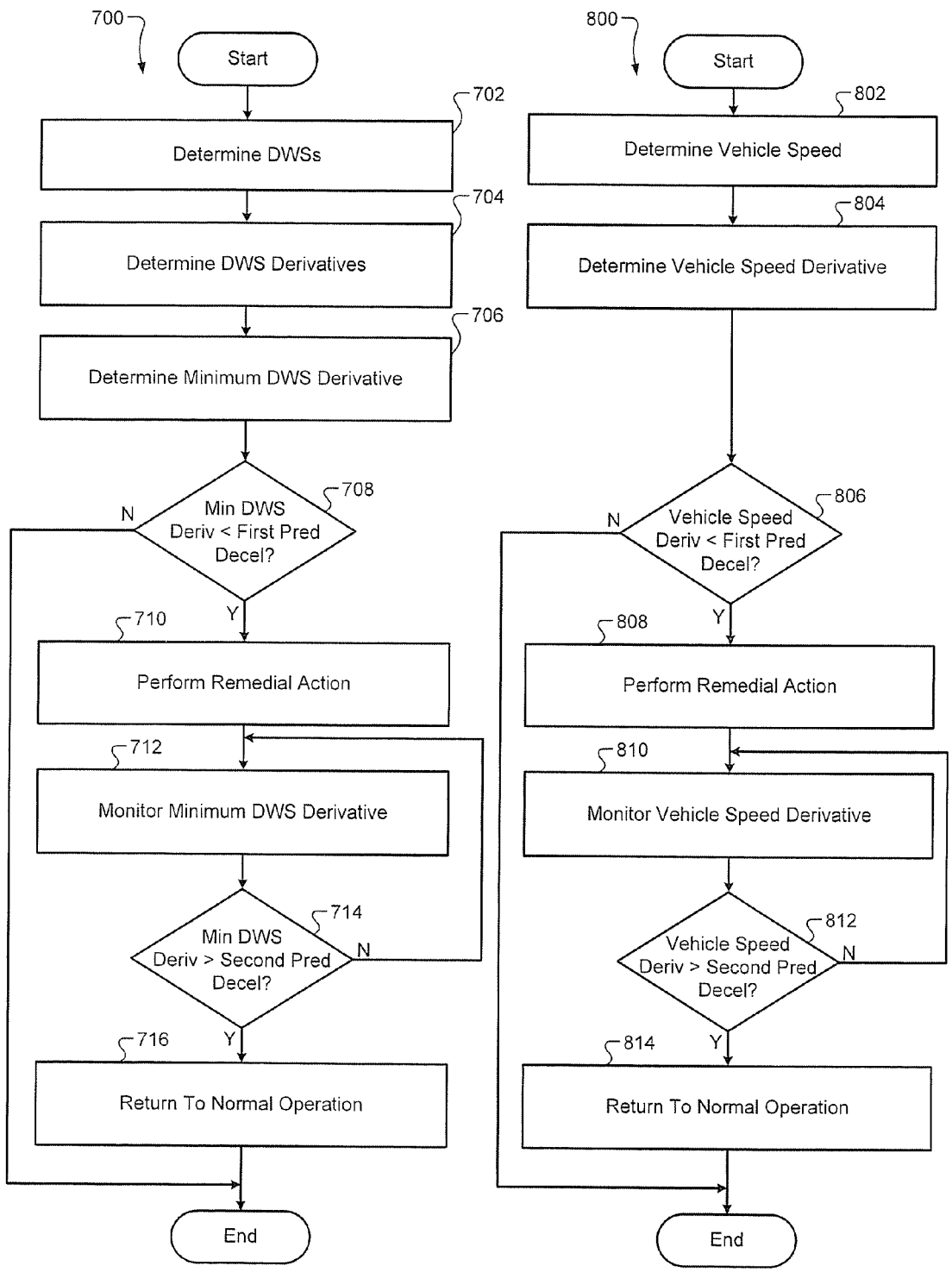

NEGATIVE WHEEL SLIP CONTROL SYSTEMS AND METHODS

FIELD

The present disclosure relates to internal combustion engines and more particularly to engine control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into gasoline engines is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the amount of air and fuel provided to the cylinders increases the torque output of the engine.

Engine control systems have been developed to control engine torque output to achieve a desired torque. Traditional engine control systems, however, do not control the engine torque output as accurately as desired. Further, traditional engine control systems do not provide a rapid response to control signals or coordinate engine torque control among various devices that affect the engine torque output.

SUMMARY

An engine control system comprises a derivative module and a slip remediation module. The derivative module determines a mathematical derivative of a driven wheel speed of a vehicle. The slip remediation module, when the mathematical derivative is more negative than a predetermined deceleration, at least one of disables regenerative braking being performed by one or more electric motors, increases an axle torque request, and unlocks a torque converter.

In other features, the driven wheel speed includes a wheel speed measured by a wheel speed sensor associated with one of the driven wheels of the vehicle.

In still other features, the driven wheel speed includes a vehicle speed.

In further features, the engine control system further comprises a vehicle speed module that determines the vehicle speed based on a transmission output speed.

In still further features, the engine control system further comprises a disabling module that disables the slip remediation module when the one or more electric motors are supplying torque output.

In other features, the engine control system further comprises a disabling module that disables the slip remediation module when a traction control system is disabled within a passenger cabin of the vehicle.

In still other features, the engine control system further comprises a disabling module that disables the slip remediation module when a fault has been diagnosed in at least one of an antilock braking system (ABS), a wheel speed sensor, and a traction control system.

In further features, the slip remediation module at least one of disables the increase in the axle torque request and resumes the regenerative braking when the mathematical derivative becomes less negative than a second predetermined deceleration that is less negative than the predetermined deceleration.

In still further features, the slip remediation module increases the axle torque request for a predetermined period and disables the increase after the predetermined period.

In other features, the derivative module determines the mathematical derivative based on a least squares derivative of a predetermined number of samples of the driven wheel speed.

An engine control method comprises: determining a mathematical derivative of a driven wheel speed of a vehicle; and at least one of disabling regenerative braking being performed by one or more electric motors, increasing an axle torque request, and unlocking a torque converter when the mathematical derivative is more negative than a predetermined deceleration.

In other features, the engine control method further comprises determining the mathematical derivative of the driven wheel speed based on a wheel speed measured by a wheel speed sensor associated with one of the driven wheels of the vehicle.

In still other features, the engine control method further comprises determining the mathematical derivative of the driven wheel speed based on a vehicle speed.

In further features, the engine control method further comprises determining the vehicle speed based on a transmission output speed.

In still further features, the engine control method further comprises disabling the at least one of the disabling the regenerative braking, the increasing the axle torque request, and the unlocking the torque converter when the one or more electric motors are supplying torque output.

In other features, the engine control method further comprises disabling the at least one of the disabling the regenerative braking, the increasing the axle torque request, and the unlocking the torque converter when a traction control system is disabled within a passenger cabin of the vehicle.

In still other features, the engine control method further comprises disabling the at least one of the disabling the regenerative braking, the increasing the axle torque request, and the unlocking the torque converter when a fault has been diagnosed in at least one of an antilock braking system (ABS), a wheel speed sensor, and a traction control system.

In further features, the engine control method further comprises at least one of disabling the increasing in the axle torque request and resuming the regenerative braking when the mathematical derivative becomes less negative than a second predetermined deceleration that is less negative than the predetermined deceleration.

In still further features, the engine control method further comprises increasing the axle torque request for a predetermined period and disabling the increasing after the predetermined period.

In other features, the engine control method further comprises determining the mathematical derivative based on a least squares derivative of a predetermined number of samples of the driven wheel speed.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

FIGS. 3A-3B are functional block diagrams of exemplary wheel slip control modules;

FIGS. 4-6 are functional block diagrams of slip remediation systems; and

FIGS. 7-8 are flowcharts depicting exemplary methods.

DETAILED DESCRIPTION

Figure 1:
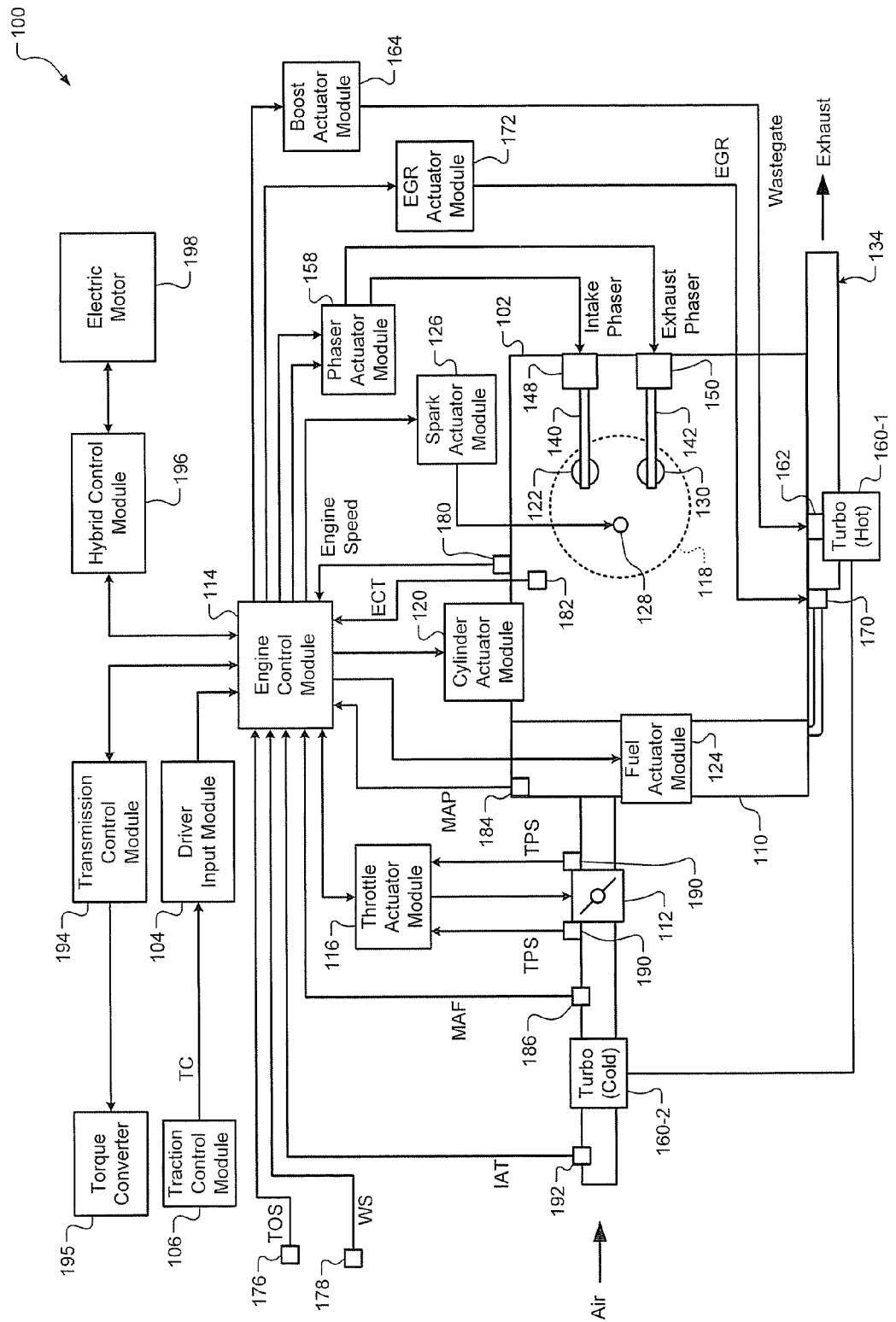
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A negative wheel slip event occurs when a tire of a vehicle slips with respect to a road surface due to the imposition of a negative torque at the wheel of the vehicle. Even when the torque at the wheel is slightly negative, a negative wheel slip event may occur when the road surface includes a low coefficient of friction, such as icy road conditions.

In some instances, regenerative braking performed by one or more electric motors of a vehicle may cause a negative wheel slip event. Frictional drag on engine components may also cause a negative wheel slip event when drive torque is reduced. An engine control module (ECM) according to the present disclosure selectively detects the negative wheel slip event based on a derivative of a wheel speed during regenerative braking. The ECM initiates remedial action when the negative wheel slip event is detected. Remedial actions that may be taken may include, for example, disabling the regenerative braking, unlocking a torque converter, and increasing axle torque to one or more driven wheels of the vehicle.

Referring now to FIG. 1, a functional block diagram of an exemplary engine system 100 is presented. The engine system 100 includes an engine 102 that combusts an air/fuel mixture to produce drive torque for a vehicle based on inputs provided by a driver input module 104 and other inputs. Inputs to the driver input module 104 may include, for example, one or more accelerator pedal positions and one or more brake pedal positions. In vehicles equipped with a traction control system, a traction control module 106 may provide a traction control (TC) signal to the driver input module 104 that indicates whether the traction control system has been enabled (i.e., ON) or disabled (i.e., OFF) within a passenger cabin of the vehicle.

While a spark ignition, gasoline-type engine will be described herein, the present disclosure is applicable to other types of torque producers, such as ethanol and methanol combusting engines, diesel-type engines, fuel cell engines, propane engines, and hybrid-type engines implementing one or more electric motors. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

Air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve of each of the cylinders. In various implementations not depicted in FIG. 1, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC).

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The spark actuator module 126 may be controlled by a timing signal indicating how far before or after TDC the spark should be provided. Operation of the spark actuator module 126 may therefore be synchronized with crankshaft rotation. In various implementations, the spark actuator module 126 may halt provision of spark to deactivated cylinders.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate the cylinder 118 by disabling opening of the intake valve 122 and/or the exhaust valve 130.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114. When implemented, variable valve lift may also be controlled by the phaser actuator module 158.

The engine system 100 may include a boost device that provides pressurized air to the intake manifold 110. For example, FIG. 1 shows a turbocharger 160 that includes a hot turbine 160-1 that is powered by hot exhaust gases flowing through the exhaust system 134. The turbocharger 160 also includes a cold air compressor 160-2, driven by the turbine 160-1, that compresses air leading into the throttle valve 112. In various implementations, a supercharger, driven by the crankshaft, may compress air from the throttle valve 112 and deliver the compressed air to the intake manifold 110.

A wastegate 162 may allow exhaust gas to bypass the turbocharger 160, thereby reducing the boost (the amount of intake air compression) of the turbocharger 160. The ECM 114 controls the turbocharger 160 via a boost actuator module 164. The boost actuator module 164 may modulate the boost of the turbocharger 160 by controlling the position of the wastegate 162. In various implementations, multiple turbochargers may be controlled by the boost actuator module 164. The turbocharger 160 may have variable geometry, which may be controlled by the boost actuator module 164.

An intercooler (not shown) may dissipate some of the compressed air charge's heat, which is generated as the air is compressed. The compressed air charge may also have absorbed heat because of the air's proximity to the exhaust system 134. Although shown separated for purposes of illustration, the turbine 160-1 and the compressor 160-2 are often attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger 160. The EGR valve 170 may be controlled by an EGR actuator module 172.

Torque output by the engine 102 may be transferred to a transmission (not shown). Based on a gear ratio engaged within the transmission, torque is selectively output from the transmission via a transmission output shaft (not shown). Torque output by the transmission may be selectively transferred to one or more wheels (not shown) to propel the vehicle.

A transmission output speed (TOS) sensor 176 may monitor rotation of the transmission output shaft and generate a TOS signal based on rotational speed of the transmission output shaft. The TOS may be used to determine, for example, vehicle speed. In vehicles having an antilock braking system (ABS), the engine system 100 may include wheel speed sensors, such as wheel speed sensor 178.

The wheel speed sensor 178 measures rotational speed of an associated wheel of the vehicle and generates a wheel speed (WS) signal accordingly. While only the single wheel speed sensor 178 is shown in FIG. 1, the engine system 100 may include more than one wheel speed sensor. For example only, one or more wheel speed sensors may be provided for each wheel of the vehicle.

A wheel to which engine torque may be transferred may be referred to as a driven wheel while a wheel to which engine torque cannot be transferred may be referred to as an undriven wheel. Accordingly, a wheel speed sensor measuring the rotational speed of a driven wheel may be said to be measuring a driven wheel speed (DWS) and a wheel speed sensor measuring the rotational speed of an undriven wheel may be said to be measuring an undriven wheel speed (UDWS).

The engine system 100 may measure the rotational speed of the crankshaft using an engine speed sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM may also communicate with the transmission control module 194 to control a state (e.g., locked or unlocked) of a torque converter 195. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. The electric motor 198 applies a braking torque when functioning as a generator. While the electric motor 198 functions as a generator, regenerative braking may be said to be occurring. The hybrid control module 196 may generate a regenerative braking signal (See FIGS. 3-4) that indicates whether regenerative braking is occurring. In various implementations, various functions of the ECM 114, the transmission control module 194, and the hybrid control module 196 may be integrated into one or more modules.

Each system that varies an engine parameter may be referred to as an actuator. Each actuator receives an actuator value. For example, the throttle actuator module 116 may be referred to as an actuator and the throttle opening area may be referred to as the actuator value. In the example of FIG. 1, the throttle actuator module 116 achieves the throttle opening area by adjusting the angle of the blade of the throttle valve 112.

Similarly, the spark actuator module 126 may be referred to as an actuator, while the corresponding actuator value may be the amount of spark advance relative to cylinder TDC. Other actuators may include the boost actuator module 164, the EGR actuator module 172, the phaser actuator module 158, the fuel actuator module 124, and the cylinder actuator module 120. For these actuators, the actuator values may correspond to boost pressure, EGR valve opening area, intake and exhaust cam phaser angles, fueling rate, and number of cylinders activated, respectively. The ECM 114 may control actuator values in order to generate a desired torque from the engine 102.

Figure 2:
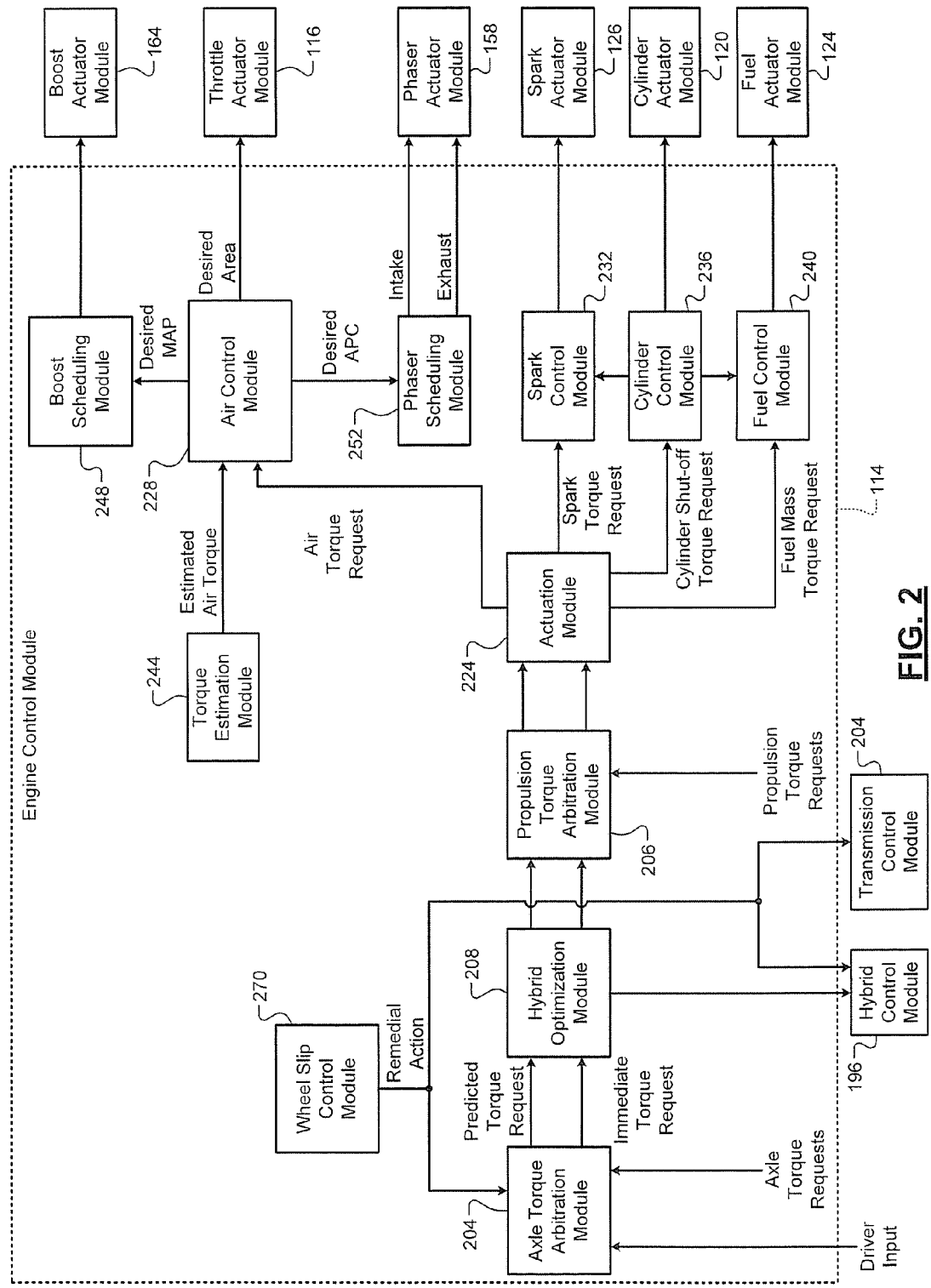
FIG. 2 is a functional block diagram of an exemplary engine control system according to the principles of the present disclosure.

Referring now to FIG. 2, a functional block diagram of an exemplary engine control system is presented. An exemplary implementation of the ECM 114 includes an axle torque arbitration module 204. The axle torque arbitration module 204 arbitrates between the driver inputs from the driver input module 104 and other axle torque requests. For example, the driver input may be based on position of the accelerator pedal. The driver input may also be based on cruise control, which may be an adaptive cruise control system that varies vehicle speed to maintain a predetermined following distance.

Torque requests may include target torque values as well as ramp requests, such as a request to ramp torque down to a minimum engine off torque or to ramp torque up from the minimum engine off torque. Axle torque requests are requests for engine torque output described in terms of torque at the wheels of the vehicle. Axle torque requests may include a torque reduction requested during positive wheel slip by the traction control system. Axle torque requests may also include torque request increases to counteract negative wheel slip, where a tire of the vehicle slips with respect to the road surface because the axle torque is negative.

Axle torque requests may also include brake management requests and vehicle over-speed torque requests. Brake management requests may reduce engine torque to ensure that the engine torque output does not exceed the ability of the brakes to hold the vehicle when the vehicle is stopped. Vehicle over-speed torque requests may reduce the engine torque output to prevent the vehicle from exceeding a predetermined vehicle speed. Axle torque requests may also be made by body stability control systems.

The axle torque arbitration module 204 outputs a predicted torque request and an immediate torque request based on the results of the arbitration of the received torque requests. The predicted torque request may be described as the amount of torque that the ECM 114 prepares the engine 102 to generate, and may often be based on the driver's torque request. The immediate torque request may be described as the amount of currently desired torque, which may be less than the predicted torque request.

The immediate torque request may be achieved by varying engine actuators that respond quickly, while slower engine actuators may be used to prepare for the predicted torque request. For example, in a gas engine, spark advance may be adjusted quickly, while air flow and cam phaser position may be slower to respond because of mechanical lag time. Further, changes in air flow are subject to air transport delays in the intake manifold. In addition, changes in air flow are not manifested as torque variations until air has been drawn into a cylinder, mixed with fuel, compressed, and combusted.

The axle torque arbitration module 204 may output the predicted torque and the immediate torque requests to a propulsion torque arbitration module 206. In various implementations, the axle torque arbitration module 204 may output the predicted and immediate torque requests to a hybrid optimization module 208. The hybrid optimization module 208 determines how much torque should be produced by the engine 102 and how much torque should be produced by the electric motor 198. The hybrid optimization module 208 then outputs modified predicted and immediate torque requests to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests, including the converted predicted and immediate torque requests. The propulsion torque arbitration module 206 may generate an arbitrated predicted torque request and an arbitrated immediate torque request. The arbitrated torque requests may be generated by selecting a winning request from among received requests. Alternatively or additionally, the arbitrated torque requests may be generated by modifying one of the received requests based on another one or more of the received requests. Propulsion torque requests are requests for engine torque output described in terms of torque at the crankshaft.

Other propulsion torque requests may include torque reductions for engine over-speed protection, torque increases for stall prevention, and torque reductions requested by the transmission control module 194 to accommodate gear shifts. Propulsion torque requests may also result from clutch fuel cutoff, which may reduce the engine torque output when the driver depresses the clutch pedal in a manual transmission vehicle.

Propulsion torque requests may also include an engine shutoff request, which may be initiated when a critical fault is detected. For example only, critical faults may include detection of vehicle theft, a stuck starter motor, electronic throttle control problems, and unexpected torque increases. For example only, engine shutoff requests may always win arbitration, thereby being output as the arbitrated torques, or may bypass arbitration altogether, simply shutting down the engine 102. The propulsion torque arbitration module 206 may still receive these shutoff requests so that, for example, appropriate data can be fed back to other torque requesters. For example, all other torque requesters may be informed that they have lost arbitration.

An actuation module 224 receives the predicted and immediate torque requests from the propulsion torque arbitration module 206. The actuation module 224 determines how the predicted and immediate torque requests will be achieved. The actuation module 224 may be engine type specific, with different control schemes for the type of engine included with the vehicle (e.g., gasoline or diesel). In various implementations, the actuation module 224 may define the boundary between modules prior to the actuation module 224, which are engine independent, and modules that are engine dependent.

For example, in a gas engine, the actuation module 224 may vary the opening of the throttle valve 112, which allows for a wide range of torque control. However, opening and closing the throttle valve 112 results in a relatively slow change in torque. Disabling cylinders also provides for a wide range of torque control, but may be similarly slow and additionally involve drivability and emissions concerns. Changing spark advance is relatively fast, but does not provide as much range of torque control. In addition, the amount of torque control possible with spark (referred to as spark capacity) changes as the air per cylinder changes.

In various implementations, the actuation module 224 may generate an air torque request based on the predicted torque request. The air torque request may be equal to the predicted torque request, causing air flow to be set so that the predicted torque request can be achieved by changes to other actuators.

An air control module 228 may determine desired actuator values for slow actuators based on the air torque request. For example, the air control module 228 may control desired manifold absolute pressure (MAP), desired throttle area, and/or desired air per cylinder (APC). Desired MAP may be used to determine desired boost, and desired APC may be used to determine desired cam phaser positions. In various implementations, the air control module 228 may also determine an amount of opening of the EGR valve 170.

In gas systems, the actuation module 224 may also generate a spark torque request, a cylinder shut-off torque request, and a fuel mass torque request. The spark torque request may be used by a spark control module 232 to determine how much to retard the spark (which reduces the engine torque output) from a calibrated spark advance.

The cylinder shut-off torque request may be used by a cylinder control module 236 to determine how many cylinders to deactivate. The cylinder control module 236 may instruct the cylinder actuator module 120 to deactivate one or more cylinders of the engine 102. In various implementations, a predefined group of cylinders may be deactivated jointly. The cylinder control module 236 may also instruct a fuel control module 240 to stop providing fuel for deactivated cylinders and may instruct the spark control module 232 to stop providing spark for deactivated cylinders.

In various implementations, the cylinder actuator module 120 may include a hydraulic system that selectively decouples intake and/or exhaust valves from the corresponding camshafts for one or more cylinders in order to deactivate those cylinders. For example only, valves for half of the cylinders are either hydraulically coupled or decoupled as a group by the cylinder actuator module 120. In various implementations, cylinders may be deactivated simply by halting provision of fuel to those cylinders, without stopping the opening and closing of the intake and exhaust valves. In such implementations, the cylinder actuator module 120 may be omitted.

The fuel mass torque request may be used by the fuel control module 240 to vary the amount of fuel provided to each cylinder. For example only, the fuel control module 240 may determine a fuel mass that, when combined with the current amount of air per cylinder, yields stoichiometric combustion. The fuel control module 240 may instruct the fuel actuator module 124 to inject this fuel mass for each activated cylinder. During normal engine operation, the fuel control module 240 may attempt to maintain a stoichiometric air/fuel ratio.

The fuel control module 240 may increase the fuel mass above the stoichiometric value to increase engine torque output and may decrease the fuel mass to decrease engine torque output. In various implementations, the fuel control module 240 may receive a desired air/fuel ratio that differs from stoichiometry. The fuel control module 240 may then determine a fuel mass for each cylinder that achieves the desired air/fuel ratio. In diesel systems, the fuel mass may be the primary actuator for controlling engine torque output.

A torque estimation module 244 may estimate torque output of the engine 102. This estimated torque may be used by the air control module 228 to perform closed-loop control of engine air flow parameters, such as throttle area, MAP, and phaser positions. For example only, a torque relationship such as $$T = f(APC, S, I, E, AF, OT, \#) \quad (1)$$

may be defined, where torque (T) is a function of air per cylinder (APC), spark advance (S), intake cam phaser position (I), exhaust cam phaser position (E), air/fuel ratio (AF), oil temperature (OT), and number of activated cylinders (#). Additional variables may be accounted for, such as the degree of opening of an exhaust gas recirculation (EGR) valve.

This relationship may be modeled by an equation and/or may be stored as a lookup table. The torque estimation module 244 may determine APC based on measured MAF and current RPM, thereby allowing closed loop air control based on actual air flow. The intake and exhaust cam phaser positions used may be based on actual positions, as the phasers may be traveling toward desired positions.

While the actual spark advance may be used to estimate torque, when a calibrated spark advance value is used to estimate torque, the estimated torque may be called an estimated air torque. The estimated air torque is an estimate of how much torque the engine 102 could generate at the current air flow if spark retard was removed (i.e., spark advance was set to the calibrated spark advance value) and all cylinders being fueled.

The air control module 228 may generate a desired manifold absolute pressure (MAP) signal, which is output to a boost scheduling module 248. The boost scheduling module 248 uses the desired MAP signal to control the boost actuator module 164. The boost actuator module 164 then controls one or more turbochargers and/or superchargers.

The air control module 228 may generate a desired area signal, which is output to the throttle actuator module 116. The throttle actuator module 116 then regulates the throttle valve 112 to produce the desired throttle area. The air control module 228 may generate the desired area signal based on an inverse torque model and the air torque request. The air control module 228 may use the estimated air torque and/or the MAF signal in order to perform closed loop control. For example, the desired area signal may be controlled to minimize a difference between the estimated air torque and the air torque request.

The air control module 228 may also generate a desired air per cylinder (APC) signal, which is output to a phaser scheduling module 252. Based on the desired APC signal and the RPM signal, the phaser scheduling module 252 may control positions of the intake and/or exhaust cam phasers 148 and 150 using the phaser actuator module 158.

Referring back to the spark control module 232, spark advance values may be calibrated at various engine operating conditions. For example only, a torque relationship may be inverted to solve for desired spark advance. For a given torque request ($T_{des}$), the desired spark advance ($S_{des}$) may be determined based on $$S_{des} = T^{-1}(T_{des}, APC, I, E, AF, OT, \#) \quad (2)$$

This relationship may be embodied as an equation and/or as a lookup table. The air/fuel ratio (AF) may be the actual ratio, as indicated by the fuel control module 240.

When the spark advance is set to the calibrated spark advance, the resulting torque may be as close to mean best torque (MBT) as possible. MBT refers to the maximum torque that is generated for a given air flow as spark advance is increased, while using fuel having an octane rating greater than a predetermined threshold and using stoichiometric fueling. The spark advance at which this maximum torque occurs may be referred to as MBT spark. The calibrated spark advance may differ from MBT spark because of, for example, fuel quality (such as when lower octane fuel is used) and environmental factors. The torque at the calibrated spark advance may therefore be less than MBT.

The ECM 114 also includes a wheel slip control module 270 that initiates remedial action when negative wheel slip is detected. The wheel slip control module 270 may detect wheel slip (e.g., caused by regenerative braking or negative axle torque) based on a minimum of driven wheel speed derivatives or a vehicle speed derivative. The remedial action taken may include, for example, disabling the regenerative braking, unlocking the torque converter 195, and/or requesting the axle torque arbitration module 204 to increase the axle torque above that which would be requested pursuant to the arbitration. The remedial action eliminates or reduces the negative wheel slip, thus increasing vehicle stability and traction. The remedial action may also minimize fuel consumption as more regenerative braking may be performed due to the detection and remediation of negative wheel slip by the wheel slip control module 270.

Referring now to FIG. 3A, a functional block diagram of an exemplary implementation of the wheel slip control module 270 is presented. The wheel slip control module 270 may include a vehicle speed module 302, a derivative module 304, a slip remediation module 306, and an enabling/disabling module 308.

The vehicle speed module 302 determines the vehicle speed based on the TOS provided by the TOS sensor 176. In other implementations, the vehicle speed module 302 may determine the vehicle speed based on one or more other suitable inputs. The vehicle speed corresponds to an average of the driven wheel speeds of the vehicle. In this manner, the vehicle speed may be used as an accurate measure of the driven wheel speed in vehicles that do not include wheel speed sensors, such as in vehicles that do not include an ABS.

The derivative module 304 determines a vehicle speed derivative based on the vehicle speed. More specifically, the derivative module 304 determines the vehicle speed derivative based on a first-derivative of the vehicle speed. In this manner, the derivative module 304 determines acceleration of the vehicle speed.

For example only, the derivative module 304 may determine the vehicle speed derivative based on a least squares derivative of a predetermined number of vehicle speed samples. The predetermined number of vehicle speed samples may be calibratable and may be set to, for example, approximately three samples. These three samples may include, for example, a current vehicle speed sample and two previous vehicle speed samples. Determining the vehicle speed derivative based on the least squares derivative provides filtering.

The slip remediation module 306 detects negative wheel slip caused by regenerative braking of the one or more electric motors 198 and/or by engine drag. The slip remediation module 306 initiates remedial action to eliminate the negative wheel slip when a negative wheel slip is detected.

The slip remediation module 306 may detect negative wheel slip based on the vehicle speed derivative. More specifically, the slip remediation module 306 may detect wheel slip when the vehicle speed derivative is less than a first predetermined deceleration. The vehicle speed derivative may include the least squares derivative or another suitable vehicle speed derivative. The first predetermined deceleration may be calibratable and may be set to, for example, approximately $-3.0$ m/s$^2$. In vehicles that do not include the traction control module 106 that allows the traction control system to be disabled, the first predetermined deceleration may be set to a lesser deceleration (i.e., closer to 0.0).

The slip remediation module 306 generates a remedial action signal that indicates whether remedial action is to be performed. The remedial action signal may be provided to one or more modules or systems that perform remedial action when remedial action is to be performed. Remedial action that may be performed when negative wheel slip is detected is discussed further below with respect to the exemplary embodiments of FIGS. 4, 5, and 6.

While the remedial action is being performed, the slip remediation module 306 may selectively disable the performance of remedial action. For example only, the slip remediation module 306 may command the return to normal operation when the negative wheel slip ends. The slip remediation module 306 may determine that the negative wheel slip has ended when the vehicle speed derivative becomes greater than a second predetermined deceleration. The second predetermined deceleration may be calibratable and may be set to, for example, approximately $-2.5$ m/s$^2$. The second predetermined deceleration may also be set to a lesser deceleration (i.e., closer to 0.0) in vehicles that do not include the traction control module 106 that allows the traction control system to be disabled.

The enabling/disabling module 308 selectively enables and disables the slip remediation module 306. For example only, the enabling/disabling module 308 may disable the slip remediation module 306 when the traction control system has been disabled via the traction control module 106. Written in another way, the enabling/disabling module 308 enables the slip remediation module 306 when the traction control system is enabled according to the traction control input to the traction control module 106. In some implementations, the enabling/disabling module 308 may also disable the slip remediation module 306 when regenerative braking is not occurring.

Referring now to FIG. 3B, another exemplary functional block diagram of the wheel slip control module 270 is presented. The wheel slip control module 270 of FIG. 3B includes a derivative module 352, a minimum module 354, and a slip remediation module 356. The wheel slip control module 270 also includes a diagnostic module 358 and an enabling/disabling module 360.

The derivative module 352 receives a driven wheel speed and determines a driven wheel speed derivative based on the driven wheel speed. The derivative module 352 determines the driven wheel speed derivative as the first-derivative of the driven wheel speed. The derivative module 352 also receives the driven wheel speed of each of the other driven wheel(s) of the vehicle and determines a respective driven wheel speed derivative for each of the other driven wheel speed(s). In this manner, the derivative module 352 determines a driven wheel speed derivative for each of the driven wheels of the vehicle.

For example only, the derivative module 352 may determine the wheel speed derivatives based on a least squares derivative of a predetermined number of samples of the wheel speeds, respectively. The predetermined number of vehicle speed samples may be calibratable and may be set to, for example, approximately three samples. Determining the wheel speed derivatives based on the least squares derivative provides filtering.

The minimum module 354 determines a minimum driven wheel speed derivative from the driven wheel speed derivatives. The minimum driven wheel speed derivative corresponds to the smallest or most negative one of the driven wheel speed derivatives.

The slip remediation module 356 detects negative wheel slip based on the minimum driven wheel speed derivative. More specifically, the slip remediation module 356 may detect negative wheel slip when the minimum driven wheel speed derivative is less than the first predetermined deceleration. The slip remediation module 356 initiates remedial action to eliminate the negative wheel slip detected. The slip remediation module 356 generates the remedial action signal that indicates whether remedial action is to be performed.

While the remedial action is being performed, the slip remediation module 356 may selectively disable the performance of remedial action. For example only, the slip remediation module 356 may command the return to normal operation when the negative wheel slip ends. The slip remediation module 356 may determine that the negative wheel slip has ended when the minimum driven wheel speed derivative becomes greater than the second predetermined deceleration.

The enabling/disabling module 360 selectively disables the slip remediation module 356 based on whether the traction control system has been disabled via the traction control module 106 and whether one or more faults have been diagnosed. For example only, the enabling/disabling module 360 may enable the slip remediation module 356 when the traction control system has not been disabled and no faults have been diagnosed. Written another way, the enabling/disabling module 360 may disable the slip remediation module 356 when the traction control system has been disabled or one or more faults have been diagnosed. The enabling/disabling module 360 may also disable the slip remediation module 356 when regenerative braking is not occurring.

The diagnostic module 358 indicates whether the one or more faults have been diagnosed. For example only, the relevant faults may include faults in one or more of the wheel speed sensors, the traction control system, and/or the ABS. The diagnostic module 358 may determine whether a fault has occurred by performing diagnostic(s) or may determine whether another system or module has diagnosed the fault from memory (not shown).

Referring now to FIGS. 4, 5, and 6, functional block diagrams of exemplary slip remediation systems 400, 500, and 600, respectively, are presented. In some implementations, the wheel slip control module 270 may output the remedial action signal to the transmission control module 194 as shown in FIG. 4. When the transmission control module 194 receives the indication that remedial action is to be taken, the transmission control module 194 may unlock the torque converter 195. Unlocking the torque converter 195 decouples the engine 102 from the transmission.

In some implementations, the wheel slip control module 270 may output the remedial action signal to the hybrid control module 196 as shown in FIG. 5. When the hybrid control module 196 receives the indication that remedial action is to be taken, the hybrid control module 196 may disable the performance of regenerative braking. For example only, the hybrid control module 196 may control the electric motor 198 stop applying braking torque.

In other implementations, such as in FIG. 6, the wheel slip control module 270 may provide the remedial action signal to the axle torque arbitration module 204 alternatively or additionally to disabling the regenerative braking. The axle torque arbitration module 204, upon receiving the indication that remedial action is to be taken, may increase the engine torque output. More specifically, the axle torque arbitration module 204 may increase the predicted and/or immediate torque requests above those that would be output as a result of the arbitration of the axle torque requests.

The axle torque arbitration module 204 may increase the predicted torque and/or the immediate torque requests at a predetermined rate (i.e., ramp in the increase). The axle torque arbitration module 204 may limit the amount of the increase in the engine torque output to a predetermined torque. The predetermined torque may correspond to a torque increase that will produce a predetermined acceleration. For example only, the predetermined torque may correspond to the predetermined acceleration of $-3.0$ m/s$^2$.

The axle torque arbitration module 204 may allow the increase in the engine torque output for a predetermined period of time. After the passing of the predetermined period of time, the axle torque arbitration module 204 may decrease the engine torque output at a predetermined rate (i.e., ramp out the increase). The axle torque arbitration module 204 may decrease the engine torque output to that which would be output resulting from the arbitration. For example only, the axle torque arbitration module 204 may decrease the predicted and/or immediate torque requests back to those that would be output as the result of the arbitration.

Referring now to FIG. 7, a flowchart depicting an exemplary method 700 is presented. The method 700 may begin in step 702 when regenerative braking is occurring. The method 700 may also verify that the traction control system has not been disabled via the traction control module 106. The method 700 determines the driven wheel speeds in step 702. The method 700 determines the driven wheel speed derivatives in step 704.

In step 706, the method 700 determines the minimum driven wheel speed derivative. The method 700 determines the minimum driven wheel speed derivative based on the smallest of, or the most negative of, the driven wheel speed derivatives. The method 700 determines whether the minimum driven wheel speed derivative (min DWS deriv) is less than the first predetermined deceleration (first pred decel) in step 708. If true, the method 700 proceeds to step 710; otherwise, the method 700 ends.

The method 700 performs remedial action in step 710. In some implementations, the remedial action taken may include disabling the regenerative braking. The remedial action taken may alternatively or additionally include temporarily increasing the predicted and/or immediate torque requests (i.e., axle torque requests) for the predetermined period and/or unlocking the torque converter 195.

The method 700 monitors the minimum driven wheel speed derivative in step 712 and determines whether the minimum driven wheel speed derivative is greater than the second predetermined deceleration (second pred decel) in step 714. If true, the method 700 returns to normal operation in step 716 and ends. If false, the method 700 returns to step 712 and continues monitoring the minimum driven wheel speed derivative. In returning to normal operation, the method 700 may, for example, resume the performance of regenerative braking, return the predicted and/or immediate torque requests to those that would be output from the arbitration, and/or resume control of the locking of the torque converter 195.

Referring not to FIG. 8, another flowchart depicting another exemplary method 800 is presented. The method 800 may begin with step 802 when regenerative braking is occurring. The method 800 may also verify that the traction control system has not been disabled via the traction control module 106 and that one or more of the faults have not been diagnosed. The method 800 determines the vehicle speed in step 802. For example only, the method 800 may determine the vehicle speed based on the TOS. In other implementations, the method 800 may determine the vehicle speed based on other suitable measures of the vehicle speed.

The method 800 determines the vehicle speed derivative in step 804. In step 806, the method 800 determines whether the vehicle speed derivative (vehicle speed deriv) is less than the first predetermined deceleration. If true, the method 800 proceeds to step 808; otherwise, the method 800 ends. The method 800 performs remedial action in step 808. In step 810, the method 800 monitors the vehicle speed derivative.

The method 800 determines whether the vehicle speed derivative is greater than the second predetermined deceleration in step 812. If true, the method 800 returns to normal operation in step 814 and ends. If false, the method 800 returns to step 810 and continues monitoring the vehicle speed derivative.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
a derivative module that determines a mathematical derivative of a driven wheel speed of a vehicle; and
a slip remediation module that, when the mathematical derivative is more negative than a predetermined deceleration, at least one of disables regenerative braking being performed by one or more electric motors, increases an axle torque request, and unlocks a torque converter.

2. The engine control system of claim 1 wherein the driven wheel speed includes a wheel speed measured by a wheel speed sensor associated with one of the driven wheels of the vehicle.

3. The engine control system of claim 1 wherein the driven wheel speed includes a vehicle speed.

4. The engine control system of claim 3 further comprising a vehicle speed module that determines the vehicle speed based on a transmission output speed.

5. The engine control system of claim 1 further comprising a disabling module that disables the slip remediation module when the one or more electric motors are supplying torque output.

6. The engine control system of claim 1 further comprising a disabling module that disables the slip remediation module when a traction control system is disabled within a passenger cabin of the vehicle.

7. The engine control system of claim 1 further comprising a disabling module that disables the slip remediation module when a fault has been diagnosed in at least one of an antilock braking system (ABS), a wheel speed sensor, and a traction control system.

8. The engine control system of claim 1 wherein the slip remediation module at least one of disables the increase in the axle torque request and resumes the regenerative braking when the mathematical derivative becomes less negative than a second predetermined deceleration that is less negative than the predetermined deceleration.

9. The engine control system of claim 1 wherein the slip remediation module increases the axle torque request for a predetermined period and disables the increase after the predetermined period.

10. An engine control method comprising:
determining, using a derivative module, a mathematical derivative of a driven wheel speed of a vehicle; and
using a slip remediation module, at least one of disabling regenerative braking being performed by one or more electric motors, increasing an axle torque request, and unlocking a torque converter when the mathematical derivative is more negative than a predetermined deceleration.

11. An engine control method comprising:
determining a mathematical derivative of a driven wheel speed of a vehicle; and
at least one of disabling regenerative braking being performed by one or more electric motors, increasing an axle torque request, and unlocking a torque converter when the mathematical derivative is more negative than a predetermined deceleration.

12. The engine control method of claim 11 further comprising determining the mathematical derivative of the driven wheel speed based on a wheel speed measured by a wheel speed sensor associated with one of the driven wheels of the vehicle.

13. The engine control method of claim 11 further comprising determining the mathematical derivative of the driven wheel speed based on a vehicle speed.

14. The engine control method of claim 13 further comprising determining the vehicle speed based on a transmission output speed.

15. The engine control method of claim 11 further comprising disabling the at least one of the disabling the regenerative braking, the increasing the axle torque request, and the unlocking the torque converter when the one or more electric motors are supplying torque output.

16. The engine control method of claim 11 further comprising disabling the at least one of the disabling the regenerative braking, the increasing the axle torque request, and the unlocking the torque converter when a traction control system is disabled within a passenger cabin of the vehicle.

17. The engine control method of claim 11 further comprising disabling the at least one of the disabling the regenerative braking, the increasing the axle torque request, and the unlocking the torque converter when a fault has been diagnosed in at least one of an antilock braking system (ABS), a wheel speed sensor, and a traction control system.

18. The engine control method of claim 11 further comprising at least one of disabling the increasing in the axle torque request and resuming the regenerative braking when the mathematical derivative becomes less negative than a second predetermined deceleration that is less negative than the predetermined deceleration.

19. The engine control method of claim 11 further comprising increasing the axle torque request for a predetermined period and disabling the increasing after the predetermined period.

20. The engine control method of claim 11 further comprising determining the mathematical derivative based on a least squares derivative of a predetermined number of samples of the driven wheel speed.

* * * * *